United States Patent [19]

Schmitt

[11] 4,436,317
[45] Mar. 13, 1984

[54] CASSETTE SEAL HAVING A COUNTERRING FREE FROM UNRELIEVED INTERNAL STRESS

[75] Inventor: Wilhelm Schmitt, Heppenheim-Erbach, Fed. Rep. of Germany

[73] Assignee: Firma Carl Freudenberg, Weinheim, Fed. Rep. of Germany

[21] Appl. No.: 456,447

[22] Filed: Jan. 7, 1983

[30] Foreign Application Priority Data

Apr. 15, 1982 [DE] Fed. Rep. of Germany ....... 3213809

[51] Int. Cl.³ ............................................. F16J 15/32
[52] U.S. Cl. .................................. 277/134; 277/153; 277/166; 277/178; 277/186
[58] Field of Search ............... 277/133, 134, 152, 153, 277/166, 178, 186

[56] References Cited

U.S. PATENT DOCUMENTS

| | | | |
|---|---|---|---|
| 3,011,814 | 12/1961 | Rhoads et al. | 277/153 X |
| 3,021,161 | 2/1962 | Rhoads et al. | 277/153 X |
| 3,086,781 | 4/1963 | Hudson et al. | 277/39 |
| 3,099,454 | 7/1963 | Walinski | 277/152 X |
| 3,179,424 | 4/1965 | Carson et al. | 277/39 X |
| 3,214,180 | 10/1965 | Hudson et al. | 277/153 X |
| 3,275,333 | 9/1966 | Scott et al. | 277/39 X |
| 3,561,770 | 2/1971 | Corsi et al. | 277/134 X |
| 3,973,779 | 8/1976 | Burgmann et al. | 277/134 X |
| 4,283,063 | 8/1981 | Prescott | 277/153 X |
| 4,285,526 | 8/1981 | Klinteberg et al. | 277/153 |

FOREIGN PATENT DOCUMENTS

| | | | |
|---|---|---|---|
| 2500099 | 7/1976 | Fed. Rep. of Germany | 277/153 |
| 56-150657 | 11/1981 | Japan | 277/152 |
| 590874 | 7/1947 | United Kingdom | 277/152 |

Primary Examiner—Robert S. Ward
Attorney, Agent, or Firm—Kenyon & Kenyon

[57] ABSTRACT

A cassette seal comprising a U-ring having legs projecting in the direction of a rotating machine part, a counterring connected to the rotating machine part, and at least one sealing lip fabricated from an elastomer material which rests under pretension against the running surface of the counterring extending in the axial direction thereby forming a seal. The counterring has the shape of a hollow cylinder and is free of unrelieved internal stresses. The counterring is associated with the legs of the U-ring with a small axial clearance on both sides whereby the counterring and the U-shaped ring enclose a hollow space having substantially rectangular boundaries. The sealing lip is mounted on the U-ring and extends into the hollow space formed by the counterring and the U-shaped ring.

17 Claims, 3 Drawing Figures

CASSETTE SEAL HAVING A COUNTERRING FREE FROM UNRELIEVED INTERNAL STRESS

FIELD OF INVENTION

This invention relates to a cassette seal comprising a U-ring having legs projecting in the direction of a relatively moving machine part, a counterring which is connected to the relatively moving machine part, and at least one firmly connected sealing lip fabricated from a polymer material which rests with pretension against the running surface of the countering extending in the axial direction thereby forming a seal.

BACKGROUND OF THE INVENTION

British Pat. No. 881,607 relates to a cassette seal of this type. The counterring comprises two angular rings which are joined together to form a U-shaped profile and which are produced by deep-drawing. The fabrication method is extremely cost-effective up to this point, but necessitates the use of deep-drawable materials, i.e., materials which have only relatively small mechanical strength. This may result in premature wear.

In addition, the running surface of deep-drawn angular rings of this type frequently exhibits a waviness which extends in the circumferential direction. When there is a high relative velocity of the sealing lip, this can lead in some regions to a reduction of the contact pressure or to a lifting of the sealing lip, which results in leaks. Elastomer materials with high flexibility are very suitable and are extensively used for making the sealing lip. However, these materials frequently have an adverse wear behavior which shortens the service life considerably.

OBJECTS OF THE INVENTION

It is an object of the present invention to provide an improved cassette seal which can be manufactured at reduced costs.

It is another object of the present invention to provide an improved cassette seal which can be installed as a closed structural unit.

It is a further object of the present invention to provide an improved cassette seal which exhibits improved wear behavior and good sealing properties largely independent of the speed of rotation of a moving machine part even if sealing lips of wear-resistant materials are used.

These and other objects will become apparent from the following description and claims in conjunction with the drawings.

SUMMARY OF THE INVENTION

According to the present invention, the problems associated with cassette seals of the type mentioned at the outset are solved by the provision of a counterring which is designed as a hollow cylinder and which is free of unrelieved internal stresses. The counterring is associated on both sides with the legs of the U-ring by a small axial spacing or clearance. The counterring and the U-ring enclose an approximately rectangular hollow space. The sealing lip is mounted on the U-ring and extends into the hollow space so formed.

The present invention may be generally summarized as a cassette seal comprising a U-ring having legs projecting in the direction of a rotating machine part, a counterring connected to the rotating machine part, and at least one sealing lip fabricated from an elastomer material which rests under pretension against the running surface of the counterring extending in the axial direction thereby forming a seal, the improvement in which comprises said counterring is in the shape of a hollow cylinder and is free of unrelieved inner stresses;

said counterring is associated with the legs of said U-ring with a small axial clearance on both sides whereby said counterring and said U-shaped ring enclose a hollow space having substantially rectangular boundaries; and said sealing lip is mounted on said U-ring and extends into said hollow space formed by said counterring and said U-shaped ring.

BRIEF DESCRIPTION OF THE DRAWING

In the drawing forming part hereof.

DESCRIPTION OF THE PREFERRED EMBODIMENTS

Figure 1:
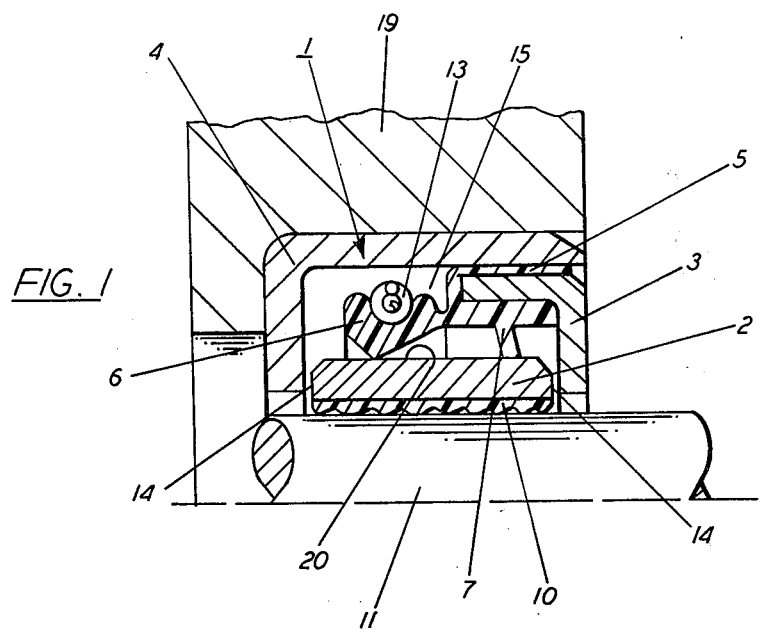
FIG. 1 is a half sectional view of a cassette seal in accordance with one embodiment of the present invention for a gap between a housing and a rotating shaft.

In order to afford a more complete understanding of the present invention and an appreciation of its advantages, a description of the preferred embodiments is presented below.

The counterring 2 of the cassette seal in accordance with the present invention has the shape of a hollow cylinder which is extremely simple to realize in technical respects. The counterring 2 can thereby be produced cost-effectively using any material which makes possible optimum material pairings with respect to obtaining a low friction coefficient vis-a-vis the sealing lip 6. In cases where the sealing lip 6 comprises, for example, rubber or plastic, for instance, PTFE, the counterring may comprise, for example, cast iron or nodular graphite castings, sintered bronze in addition to steel. The running surface proper of the counterring 2 (i.e. the surface contacted by the sealing lip 6) may optionally be smoothed and in addition hardened.

The material used for making the counterring 2 can therefore be chosen from a broad spectrum, but it must have no unrelieved internal stresses of any kind, which can lead to a change of the rotational symmetry during use. If malleable alloys of metal are used, for instance, deep-drawable materials of this kind, the generation of an axial offset on one or both sides must absolutely be avoided in connection with the fabrication of the hollow cylinder, because this leads of necessity to zones of more or less pronounced orientation of the crystallite structure which extend into the hollow cylinder and are distributed over the circumference. Such an offset therefore has as a result a different surface structure distributed over the circumference and thereby, unequalized friction conditions, as has waviness of the circumferential surface. Both shortcomings cannot be corrected by chip-removing machining.

If cold-drawn materials are used it must be strictly observed that the crystal structure is oriented throughout in the circumferential or lengthwise direction. The required hollow cylinder can therefore not be obtained by stamping from deep-drawn sheet stock but preferably is obtained from semifinished materials supplied in tubular form.

Extruded and/or cold-drawn materials frequently have an absolutely rotation-symmetrical profile due to their manufacture as well as a surface which is very largely free of roughness. For this reason, the use of such material is preferred for manufacturing the counterring. If materials obtained in another way are used, a finishing operation by grinding and, if necessary, by polishing may be advisable in individual cases. The costs accruing in this case are relatively low if cutting to length of the individual counterrings follows the corresponding machining processes.

Some of the above-mentioned materials are distinguished not only by great surface hardness, which is extremely positive, but additionally by high brittleness which may result in destruction or damage during the installation or as the result of a different thermal expansion of an immediately adjoining machine part. For this reason, the counterring 2 is preferably supported on a sufficiently thick layer 10 of a soft-elastic material, for instance, on a layer of rubber which has ribs in the circumferential direction. This also ensures a static seal against the adjoining machine part.

The sealing lip 6 is connected to the U-ring 1 by a thin, diaphragm-like transition piece and is therefore able to readily follow radial shaft displacements even if relatively tough materials are used. Because of the absolute rotational symmetry of the counterring 2, appreciable elasticity is not required and many materials can therefore be included in the considerations which heretofore did not seem to be suitable for fabricating a dynamically stressed sealing lip, for instance, PP or PES. Also coating the regions stressed in friction with a thin foil of such a material can be considered.

The legs of the U-ring 1 projecting in the radial direction overlap the axial end faces 14 of the counterring 2 on both sides with a small spacing. They can approach closely the surface of the relatively moving machine part and in this case ensure an additional protection to the counterring 2 against impact stresses during installation or storage. It is of great importance also in this respect that the counterring, due to the action of the sealing lip connected to the U-ring, is always related to the latter in a rotation-symmetrical manner. For proper storage and installation, neither a special packaging effort is required, nor a special training of the personnel employed.

The small clearance between the legs of the U-ring 1 and the end faces 14 of the counterring 2 has at the same time the effect of a labyrinth gap, by which the actual sealing zone is protected against pressure peaks of the sealed-off medium as well as against components with abrasive action penetrating from the region facing away from the sealed-off medium. This results in a further improvement of the running time. That is, the sealing lip 6 is protected from the direct force of pressure surges from the sealed-off medium by the small gap. In addition, abrasive components from the exterior are retarded from entering into the region of the sealing lip by the small gap or clearance.

In the cassette seal of the present invention, the sealing lip 6 is arranged in a space which is predominantly closed off from the outside, and is related to the running surface of the counterring 2 in a very definite manner from the start. Neither improper storage nor improper installation can therefore lead to damage of the sealing lip and result in premature failure.

For obtaining a dynamic sealing effect, the running surface of the counterring 2 may have at least one swirl rib and/or swirl slot for returning leakage liquid which has penetrated under the sealing lip 6 into the sealed-off space. They are preferably designed merging into each other and have, as seen over the circumference, a changing axial distance from the sealing lip.

In cases where several such swirl ribs and/or swirl slots are provided, it has been found practical to make them identical and to arrange them at spacings uniformly distributed over the circumference.

The hollow cylinder forming the counterring 2 may have annular projections 9 on both sides (see, e.g., FIG. 2) which extend beyond the legs of the U-ring and have radial spacings therefrom. In addition to an extension of the labyrinth gap enclosed by both parts, an improved mutual relationship in the axial and radial direction results. In the vicinity of the annular projections 9, the labyrinth gap preferably has the same width as in the region of the axial end faces 14 of the hollow cylinder.

The U-ring 1 can be produced cost-effectively from two angular rings 3, 4 connected in a sealing manner, including the counterring. These may comprise metal or plastic. The metallic design will generally be preferred because of its greater ruggedness. It is further made possible by a metal design to form a sealing lip of an elastomer material and to join it directly to one of the two angular rings by vulcanizing; and to attach at the time an optionally following dust lip 7 and/or a rubber layer as a seal against the other angular ring. The assembly of the individual parts requires in this case only simple joining and pressing-together.

The cassette seal of the present invention makes finishing and hardening of the relatively moving machine part unnecessary, as compared to conventional radial shaft sealing rings. The moving machine part has no direct contact of any kind with the sealing lip fabricated from a polymer material; it cannot run in, and machining to equalize the surface of the shaft is obviated even after repeated replacement. The conditions relating to the friction in the vicinity of the sealing lip can be optimized in a cost-effective manner, whereby the thermal stress of the sealing lip is reduced substantially. It is an advantage worth pointing out that improper storage and installation of the cassette seal can no long regularly cause a shortened service life.

The cassette seal of the present invention will now be further described with reference to the figures of the drawing.

The cassette seal in the embodiment of the invention illustrated in FIG. 1 comprises a U-ring 1 (i.e. a ring having a U-shaped cross-section) which is anchored, liquid-tight and secured against rotation, in the bore hole of a housing 19. The sealing lip 6 is mounted on the U-ring 1 and is pressed by the ring coil spring 13 against the running surface 20 of the counterring 2 which corotates with the shaft 11.

The U-ring 1 comprises two angular rings (i.e., rings having an angle or L-shaped cross-section) fabricated, for example, from sheet steel produced by deep drawing, namely, the outer angular ring 4 and the inner angular ring 3. These are joined together in such a way that the legs of the profile or cross-section, extending in the axial and radial direction, enclose a hollow space with approximately rectangular boundaries.

The dimensional accuracy of the two angular rings includes deviations from absolute rotational symmetry within the usual tolerance limits. These deviations, however, are without decisive significance inasmuch as direct contact with relatively moving surfaces does not exist. In addition, a certan amount of equalization of different deviations is obtained by the force-locking impression into the rotation-symmetrically generated housing bore hole.

The inner angular ring 3 is fixed relative to the outer angular ring 4 by, e.g., a rubber layer 5 in a liquid-tight manner and is thus secured against rotation. The rubber layer 5 is a part of the body of material comprising the sealing lip 6 and the dust lip 7, which may also be formed, e.g., from rubber and is joined, e.g., adhesively to the inner angular ring 3. The Shore-A hardness may be, e.g., 86, and the profiles of the sealing lip 6 and the dust lip 7 may correspond to those of the known radial shaft sealing rings. The dust lip 7 rests on the running surface 20 of the counterring 2 on the side of the sealing lip 6 facing away from the pressure of the sealed off medium.

Radial shaft displacements can easily be followed by the sealing lip 6 which may be fabricated from a relatively hard material, due to a constriction 15 acting as a joint. The dust lip 7 is pressed by its pretension alone against the running surface 20 of the counterring 2. In the case of the sealing lip 6, a circular coil spring 13 of metal is provided for aiding the contact pressure. Thereby, an equalized contact pressure over long periods of time is promoted.

The counterring 2 may be a section of a seamless drawn steel tube with a polished surface and a wall thickness of, for example, 4.5 mm. The Rockwell hardness may be 65.

The counterring 2 is provided on the inside with a damping layer 10 of soft-elastic material. This ensures a fixation on the surface of the shaft 11 which is secure against rotation and is liquid-tight. Rubber is preferred, but damping layers which are plastically deformed in the assembly, for instance, of lead or copper may be used.

The end faces 14 of the counterring 2 have a small axial spacing, for example, of 0.2 mm from the legs of the U-ring 1 extending in the radial direction. An asymmetrical mutual relationship due to the assembly of the cassette seal generally has no adverse influence and is equalized automatically by the resilience of the damping layer 10 during the first revolutions of the shaft 11. It is also possible to adjust the gap in the new seal by means of spacers of a soft material (for example, plastic) inserted on both sides which are destroyed by the mutual rotation of the two rings during operation. Such spacers if designed with an angular shape can make at the same time separate packing unnecessary.

Figure 2:
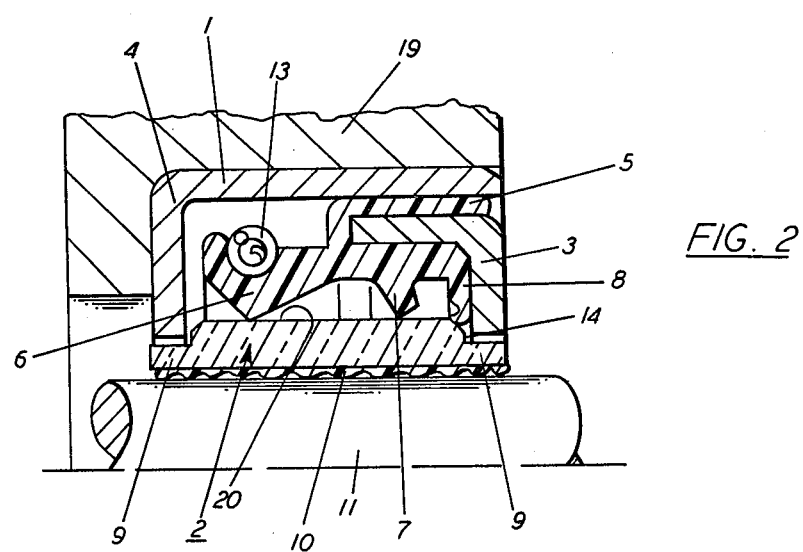
FIG. 2 is a half sectional view of a cassette seal in accordance with another embodiment of the present invention similar to the embodiment of FIG. 1 wherein the counterring is provided with annular projections and a dirt deflector is provided following the dust lip.

The embodiment of the invention according to FIG. 2 substantially corresponds operationally to that according to FIG. 1. The dust lip 7, however, is followed in this case by a dirt reflector 8, which enables the cassette seal to be used under difficult conditions, for instance, in the area of the axle drive of earth moving equipment. As illustrated, the dust lip 8 is on the side of the cassette seal which faces away from the sealed off medium.

The counterring 2 may be fabricated from vitreous ceramic and has on both sides ring projections 9 which extend in the axial direction beyond the legs of the U-ring 1 which project inward in the radial direction. Thereby, an improved mutual radial and axial interrelation is achieved. The axial clearance between the end faces 14 and the inward projecting legs of the U-ring 1 is automatically equalized, furthermore, by the spring-back of the damping layer 10 upon relaxation of the pressing-in force, if the pressing into the gap between the shaft 11 and the housing bore hole is accomplished by exerting a force on an exposed ring projection 9.

Figure 3:
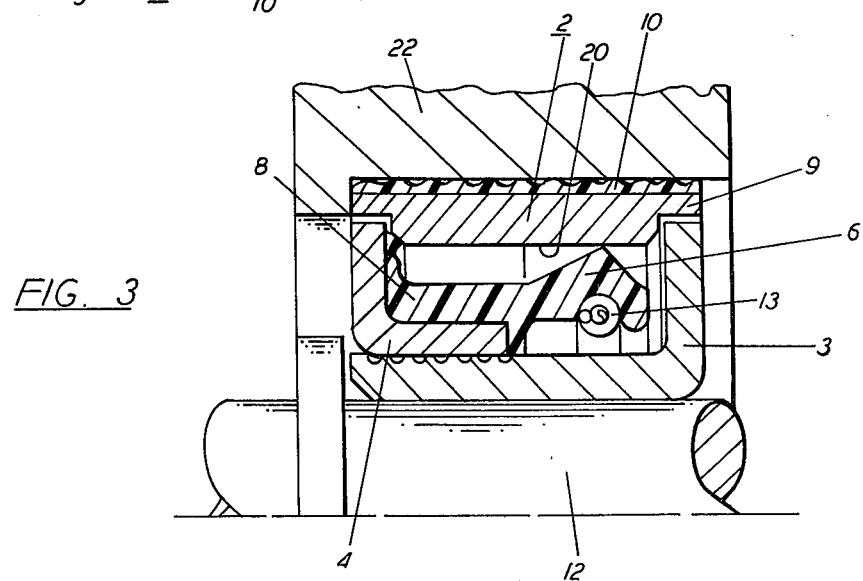
FIG. 3 is a half sectional view of a cassette seal in accordance with another embodiment of the present invention for a gap between a revolving housing and a stationary shaft.

FIG. 3 illustrates an embodiment of the cassette seal of the invention directed to the sealing of a rotating hub 22 against a stationary shaft 12. If there is significant dirt exposure, a dirt deflector 8 which follows the sealing lip 6 proper may be also provided in this case on the side of the sealing lip 6 facing away from the sealed off medium. A dust lip 7 is not provided in the embodiment illustrated. The running surface 20 is formed by the inside of the counterring 2 which revolves with the hub. For pressing the sealing lip on the running surface 20, a ring coil spring 13 is provided which can be stressed in compression and is radially placed in a slot within the sealing lip.

The counterring 2 may be fabricated, e.g., from a corrosion-proof alloy steel and may have a highly polished molybdenum coating for improving the abrasion resistance. Ring projection 9 on both sides and a damping layer 10 of, e.g., soft rubber, provided with ribs in the circumferential direction, facilitate the close-fitting assembly.

Although preferred embodiments of the present invention have been described in detail, it is contemplated that modifications may be made within the spirit and scope of the invention.

What is claimed is:

1. In a cassette seal compring a U-ring having legs projecting in the direction of a relatively rotating machine part, a counterring connected to the relatively rotating machine part, and at least one sealing lip fabricated from an elastomer material which rests under pretention against the running surface of the counterring extending in the axial direction thereby forming a seal, the improvement which comprises said counterring is in the shape of a hollow cylinder and is free of unrelieved internal stresses;

said counterring is associated with said legs of said U-ring with a small axial clearance on both sides whereby said counterring and said U-ring enclose a hollow space having substantially rectangular boundaries; and said sealing lip is mounted on said U-ring and extends into said hollow space formed by said counterring and said U-ring.

2. A cassette seal according to claim 1 wherein the running surface of said counterring has at least one swirl rib for returning leakage liquid that has penetrated under the sealing lip to the sealed space.

3. A cassette seal according to claim 1 wherein the running surface of said counterring has at least one swirl slot for returning leakage liquid that has penetrated under the sealing lip to the sealed space.

4. A cassette seal according to claim 3 wherein the swirl rib encloses the running surface and is designed with the axial distance from the sealing lip being continuously variable.

5. A cassette seal according to claim 3 wherein the swirl slot encloses the running surface and is designed with the axial distance from the sealing lip being continuously variable.

6. A cassette seal according to claim 1 wherein the cylinder surface of the counterring facing away from the running surface is provided with a damping layer of a soft-elastic material and the counterring has annular projections on both sides which extend beyond the legs of the U-ring in the axial direction and have a clearance therefrom in the radial direction.

7. A cassette seal according to claim 1 wherein the counterring has annular projections on both sides which extend beyond the legs of the U-ring in the axial direction and have a clearance therefrom in the radial direction.

8. A cassette seal according to claim 7 wherein the clearance in the radial direction between said annular projections and the legs of the U-ring is substantially equal to the clearance in the axial direction between both sides of the counterring and the legs of the U-ring.

9. A cassette seal according to claim 6 wherein the clearance in the radial direction between said annular projections and the legs of the U-ring is substantially equal to the clearance in the axial direction between both sides of the counterring and the legs of the U-ring.

10. A cassette seal according to claim 7 wherein the U-ring is formed by two rings each having an angle-shaped cross-section joined together in sealing engagement.

11. A cassette seal according to claim 6 wherein the U-ring is formed by two rings each having an angle-shaped cross-section joined together in sealing engagement.

12. A cassette seal according to claim 1 wherein the U-ring has mounted thereon at least one dust lip which rests on the running surface of the counterring on the side of the sealing lip facing away from the pressure of the sealed off medium.

13. A cassette seal according to claim 7 wherein the U-ring has mounted thereon at least one dust lip which rests on the running surface of the counterring on the side of the sealing lip facing away from the pressure of the sealed off medium.

14. A cassette seal according to claim 6 wherein the U-ring has mounted thereon at least one dust lip which rests on the running surface of the counterring on the side of the sealing lip facing away from the pressure of the sealed off medium.

15. A cassette seal according to claim 8 wherein the U-ring has mounted thereon at least one dust lip which rests on the running surface of the counterring on the side of the sealing lip facing away from the pressure of the sealed off medium.

16. A cassette seal according to claim 9 wherein the U-ring has mounted thereon at least one dust lip which rests on the running surface of the counterring on the side of the sealing lip facing away from the pressure of the sealed off medium.

17. A cassette seal according to claim 1 wherein said counterring is fabricated from a material selected from the group consisting of steel, cast iron, nodular graphite castings and sintered bronze.

* * * * *